US012592990B2

(12) United States Patent
Wang et al.

(10) Patent No.: US 12,592,990 B2
(45) Date of Patent: Mar. 31, 2026

(54) METHOD AND APPARATUS FOR PROCESSING CALLER RING BACK TONE, STORAGE MEDIUM, AND ELECTRONIC DEVICE

(71) Applicant: ZTE Corporation, Shenzhen (CN)

(72) Inventors: Yanan Wang, Shenzhen (CN); Sibing Deng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 161 days.

(21) Appl. No.: 18/566,729

(22) PCT Filed: Apr. 28, 2022

(86) PCT No.: PCT/CN2022/089965
§ 371 (c)(1),
(2) Date: Dec. 4, 2023

(87) PCT Pub. No.: WO2022/252891
PCT Pub. Date: Dec. 8, 2022

(65) Prior Publication Data
US 2024/0275882 A1      Aug. 15, 2024

(30) Foreign Application Priority Data

Jun. 4, 2021      (CN) .......................... 202110627524.3

(51) Int. Cl.
H04M 3/42          (2006.01)
H04M 3/53          (2006.01)
(52) U.S. Cl.
CPC ..... H04M 3/42017 (2013.01); H04M 3/5315 (2013.01)

(58) Field of Classification Search
None
See application file for complete search history.

(56) References Cited

U.S. PATENT DOCUMENTS

| | | |
|---|---|---|
| 2008/0120176 A1 | 5/2008 | Batni et al. |
| 2008/0181372 A1* | 7/2008 | Heldenbrand .......... H04W 4/16 |
| | | 379/88.13 |
| 2021/0044643 A1 | 2/2021 | Bouvet et al. |

FOREIGN PATENT DOCUMENTS

| | | |
|---|---|---|
| EP | 2302962 A1 | 3/2011 |

OTHER PUBLICATIONS

International Search Report for corresponding application PCT/CN2022/089965 filed Apr. 28, 2022; Mail date Jul. 25, 2022.
European Search Report for corresponding application EP22814938; Mail date Aug. 16, 2024.

* cited by examiner

*Primary Examiner* — Antim G Shah
(74) *Attorney, Agent, or Firm* — CANTOR COLBURN LLP

(57) ABSTRACT

Provided in the embodiments of the present disclosure are a method and apparatus for processing a Caller Ring Back Tone (CRBT), a storage medium and an electronic device. The method includes: receiving, via a core network, a call request initiated by a calling user towards a called user; sending, according to the call request, to the calling user a video CRBT preset by the called user, and notifying the calling user to play back the video CRBT; and sending the call request to the called user after a playback duration of the video CRBT reaches a preset configuration duration.

14 Claims, 4 Drawing Sheets

Fig. 2

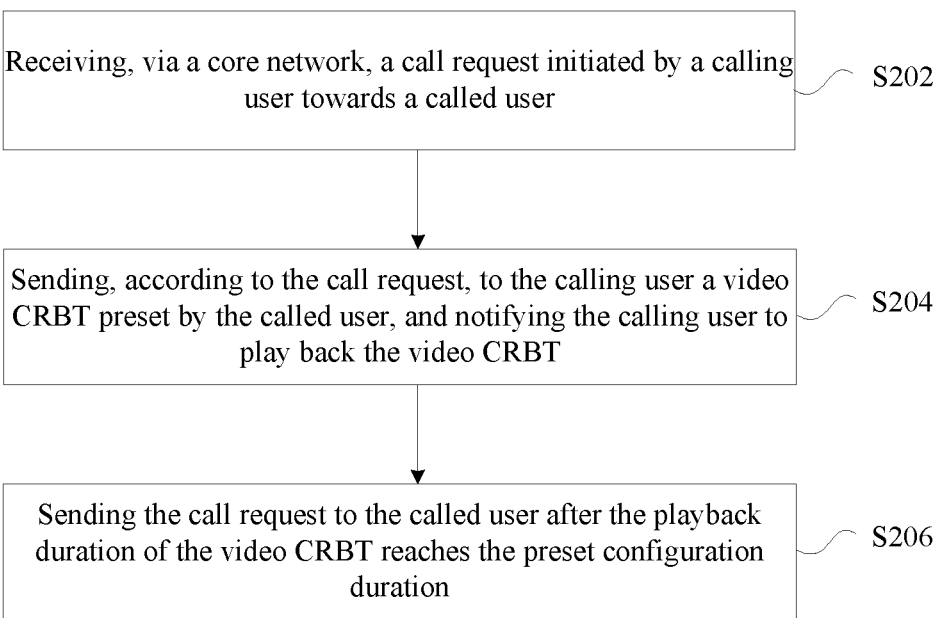

Receiving, via a core network, a call request initiated by a calling user towards a called user — S202

Sending, according to the call request, to the calling user a video CRBT preset by the called user, and notifying the calling user to play back the video CRBT — S204

Sending the call request to the called user after the playback duration of the video CRBT reaches the preset configuration duration — S206

1

METHOD AND APPARATUS FOR PROCESSING CALLER RING BACK TONE, STORAGE MEDIUM, AND ELECTRONIC DEVICE

CROSS-REFERENCE TO RELATED APPLICATION

The present disclosure is a National Stage Filing of the PCT International Application No. PCT/CN2022/089965 filed on Apr. 28, 2022, which claims priority to Chinese Patent Application CN202110627524.3, filed on Jun. 4, 2021 and entitled "Method and Apparatus for Processing Caller Ring Back Tone, Storage Medium, and Electronic Device", the disclosed content of which is incorporated herein by reference in its entirety.

TECHNICAL FIELD

The embodiments of the present disclosure relate to the field of communications, and in particular, to a method and apparatus for processing a Caller Ring Back Tone (CRBT), a storage medium, and an electronic device.

BACKGROUND

A conventional CRBT is a ring back tone service that provides special sound effects (music, song, story line, character dialogue, etc.) customized by a called user for other calling users who call the mobile phone of this called user. With the development of Fifth Generation (5G) communication technologies and Internet technologies, a video Caller Ring Back Tone (video CRBT) emerges. When a user makes a voice call or video call, he/she will see a piece of video content before the call is answered.

The rapid development of short videos is one of the reasons for the launch of the video CRBT. The pace of modern life is fast, most people wish to get more hot information in fragmented time to catch up with the fast pace of life, and short video is a new thing that people can recognize and get involved in more quickly. Some personally customized video CRBT, such as New Year greeting videos, may instantly enhance the user's sense of trust and loyalty, and the user may naturally realize the value of the video CRBT. Some other personally customized video CRBT, such as enterprise or charity promotional videos, may facilitate the promotion of enterprise images and products, as well as charity ideas and knowledge.

The promotion value of the CRBT mainly depends on the playback duration of short videos. How to enable users to listen to and/or watch the CRBT to the maximum extent has become the main problem currently faced. This is mainly reflected in the following two aspects.

The duration it takes for the called user to answer the phone affects the duration in which the calling user can watch the CRBT. If the called user answers the call, the calling user cannot continue watching the CRBT even if the calling user still wants to watch the CRBT.

The communication state of the called user affects whether the calling user can listen to and/or watch the CRBT. Only when the called user is in an idle state, the calling user can listen to and/or watch the CRBT. If the called user is in a busy state, the calling user cannot listen to and/or watch the CRBT, that is to say, for one called user, only one calling user can listen to and/or watch the CRBT at the same time.

No solution has been proposed for the problem in the related art of a poor promotion effect of a CRBT service due to the fact that for one called user, only one calling user can listen to and/or watch a CRBT at the same time and that a listening and/or watching duration of the CRBT is affected by a duration it takes for the called user to answer the phone.

SUMMARY

The embodiments of the present disclosure provide a method and apparatus for processing a CRBT, a storage medium, and an electronic device, which may solve the problem in the related art of a poor promotion effect of a CRBT service due to the fact that for one called user, only one calling user can listen to and/or watch a CRBT at the same time and that a listening and/or watching duration of the CRBT is affected by a duration it takes for the called user to answer the phone.

According to an embodiment of the present disclosure, provided is a method for processing a CRBT, including:

receiving, via a core network, a call request initiated by a calling user towards a called user;

sending, according to the call request, to the calling user a video CRBT preset by the called user, and notifying the calling user to play back the video CRBT; and sending the call request to the called user after a play back duration of the video CRBT reaches a preset configuration duration.

In an exemplary embodiment, the method further includes:

determining whether a prolonging instruction sent by the calling user for prolonging play back of the video CRBT is received within the preset configuration duration; and sending, when the prolonging instruction is received within the preset configuration duration, a prompt message to the called user while sending the call request to the called user, wherein the prompt message is used for prompting that the calling user prolongs the playback of the video CRBT.

In an exemplary embodiment, sending the call request to the called user after the playback duration of the video CRBT reaches the preset configuration duration includes:

determining whether a prolonging instruction sent by the calling user for prolonging play back of the video CRBT is received within the preset configuration duration; and when the prolonging instruction is received within the preset configuration duration, after the playback duration of the video CRBT reaches the preset configuration duration, prolonging the playback duration of the video CRBT for a preset duration, and then sending the call request to the called user.

In an exemplary embodiment, sending the call request to the called user after the playback duration of the video CRBT reaches the preset configuration duration includes:

determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, sending the call request and the prolonging instruction to the called user, wherein the prolonging instruction is used for prompting the called user to determine whether to postpone answering a call requested by the call request.

In an exemplary embodiment, the method further includes:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the play back duration.

In an exemplary embodiment, the method further includes:

recommending, according to the stored correlation between the video CRBT and the play back duration and taking a preset length of time as a period, to the called user an optimization solution for optimizing the video CRBT.

According to another embodiment of the present disclosure, further provided is an apparatus for processing a CRBT, including:

a receiving module, configured to receive, via a core network, a call request initiated by a calling user towards a called user;

a notification module, configured to send, according to the call request, to the calling user a video CRBT preset by the called user, and notify the calling user to play back the video CRBT; and a first sending module, configured to send the call request to the called user after a playback duration of the video CRBT reaches a preset configuration duration.

In an exemplary embodiment, the apparatus further includes:

a determination module, configured to determine whether a prolonging instruction sent by the calling user for prolonging playback of the video CRBT is received within the preset configuration duration; and a prompt module, configured to send, when the prolonging instruction is received within the preset configuration duration, a prompt message to the called user while sending the call request to the called user, wherein the prompt message is used for prompting that the calling user prolongs the play back of the video CRBT.

In an exemplary embodiment, the first sending module includes:

a determination sub-module, configured to determine whether a prolonging instruction sent by the calling user for prolonging playback of the video CRBT is received within the preset configuration duration; and a sending sub-module, configured to prolong, when the prolonging instruction is received within the preset configuration duration, after the playback duration of the video CRBT reaches the preset configuration duration, the play back duration of the video CRBT for a preset duration, and then sending the call request to the called user.

In an exemplary embodiment, the first sending module is further configured to:

determine whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, send the call request and the prolonging instruction to the called user, wherein the prolonging instruction is used for prompting the called user to determine whether to postpone answering a call requested by the call request.

In an exemplary embodiment, the apparatus further includes:

a receiving module, configured to receive an answering instruction indicating that the called user answers a call requested by the call request;

a second sending module, configured to stop sending the video CRBT to the calling user according to the answering instruction; and a storage module, configured to store, when the playback duration of the video CRBT is greater than the preset configuration duration, a correlation between the video CRBT and the playback duration.

In an exemplary embodiment, the apparatus further includes:

an optimization module, configured to recommend, according to the stored correlation between the video CRBT and the playback duration and taking a preset length of time as a period, to the called user an optimization solution for optimizing the video CRBT.

According to another embodiment of the present disclosure, a computer-readable storage medium is further provided, the storage medium stores a computer program, wherein the computer program, when running on a processor, causes the processor to execute the operations in any one of the described method embodiments.

According to another embodiment of the present disclosure, further provided is an electronic device, including a memory and a processor, wherein the memory stores a computer program, and the processor is configured to run the computer program to execute the operations in any one of the method embodiments.

According to the embodiments of the present disclosure, a call request initiated by a calling user towards a called user is received via a core network: a video CRBT preset by the called user is sent to the calling user according to the call request, and the calling user is notified to play back the video CRBT; and the call request is sent to the called user after a playback duration of the video CRBT reaches a preset configuration duration. The problem in the related art of a poor promotion effect of a CRBT service due to the fact that for one called user, only one calling user can listen to and/or watch a CRBT at the same time and that a listening and/or watching duration of the CRBT is affected by a time when the called user answers a phone may be solved. The call request is transferred to the called user after a configuration duration, such that the calling user can watch the CRBT for a period of time before the called user senses a call, and when multiple calling parties call the called user, the plurality of calling parties can watch, at the same time, the CRBT set by the called user, thereby greatly enlarging the play back range of the CRBT of the called user.

BRIEF DESCRIPTION OF THE DRAWINGS

FIG. 2 is a flowchart of a method for processing a CRBT according to an embodiment of the present disclosure;

DETAILED DESCRIPTION

The embodiments of the present disclosure are described in detail with reference to the accompanying drawings and in conjunction with the embodiments.

It should be noted that the terms "first", "second" etc. in the description, claims, and accompanying drawings of the present disclosure are used to distinguish similar objects, and are not necessarily used to describe a specific sequence or order.

Figure 1:
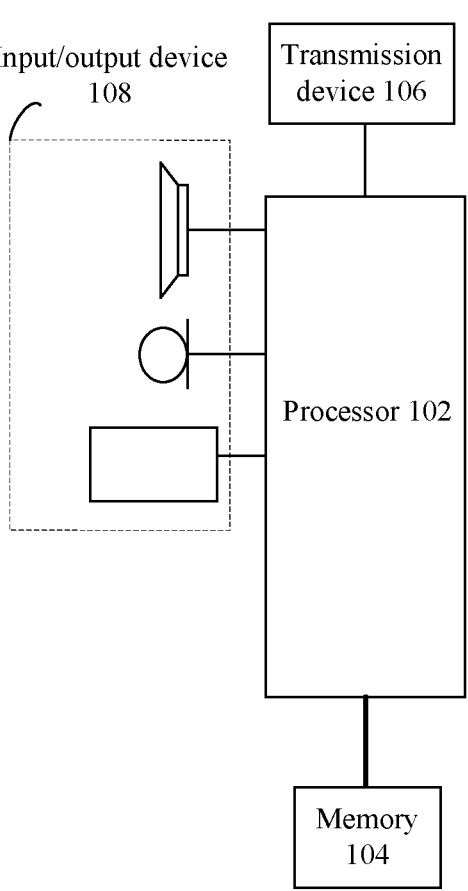
FIG. 1 is a block diagram showing the hardware structure of a mobile terminal for implementing a method for processing a CRBT according to an embodiment of the present disclosure.

The method embodiments provided in the embodiments of the present disclosure may be executed in a mobile terminal, a computer terminal, or a similar computing apparatus. Taking the execution on the mobile terminal as an example, FIG. 1 is a block diagram showing the hardware structure of a mobile terminal for implementing a method for processing a CRBT according to an embodiment of the present disclosure: as shown in FIG. 1, the mobile terminal may include one or more (only one is shown in FIG. 1) processors 102 (the processors 102 may include, but are not limited to, a processing device such as a microprocessor (e.g., a Micro Controller Unit (MCU)) or a programmable logic device (e.g., a Field Programmable Gate Array (FPGA)), and a memory 104 configured to store data. The mobile terminal may further include a transmission device 106 for a communication function and an input/output device 108. Those having ordinary skill in the art may appreciate that the structure shown in FIG. 1 is for illustrative purposes only, but does not limit the structure of the mobile terminal. For example, the mobile terminal may also include more or fewer components than that shown in FIG. 1, or have a different configuration than that shown in FIG. 1.

The memory 104 may be configured to store a computer program, for example, a software program and a module of application software, such as a computer program corresponding to the method for processing a CRBT in the embodiments of the present disclosure. The processor 102 runs the computer program stored in the memory 104, so as to execute various function applications and service chain address pool slicing processing, that is, to implement the foregoing method. The memory 104 may include a high-speed random access memory, and may also include a non-transitory memory; such as one or more magnetic storage apparatuses, flash memories, or other non-transitory solid-state memories. In some instances, the memory 104 may further include a memory remotely arranged with respect to the processor 102, and the remote memory may be connected to the mobile terminal over a network. Examples of the described network include, but are not limited to, the Internet, an intranet, a local area network, a mobile communication network, and a combination thereof.

The transmission device 106 is configured to receive or transmit data over a network. Specific examples of the described network may include a wireless network provided by a communication provider of the mobile terminal. In one example, the transmission device 106 includes a network interface controller (NIC) which may be connected to other network devices via a base station, thereby being able to communicate with the Internet. In one example, the transmission device 106 may be a Radio Frequency (RF) module for communicating wirelessly with the Internet.

The present embodiment provides a method for processing a CRBT, which is applied to a terminal, and the method may run on the described mobile terminal or network architecture. The terminal may access a current Main Node (MN) cell and a current Secondary Node (SN) cell of a source region via Dual Connection (DC). FIG. 2 is a flowchart of a method for processing a CRBT according to an embodiment of the present disclosure. As shown in FIG. 2, the flow includes the following operations S202 to S206.

At S202, a call request initiated by a calling user towards a called user is received via a core network.

At S204, a video CRBT preset by the called user is sent to the calling user according to the call request, and the calling user is notified to play back the video CRBT.

At S206, the call request is sent to the called user after a playback duration of the video CRBT reaches a preset configuration duration.

In some exemplary implementations of the present embodiment, the operation S206 may be implemented in the following manner. Whether a prolonging instruction sent by the calling user for prolonging playback of the video CRBT is received within the preset configuration duration is determined; and when the prolonging instruction is received within the preset configuration duration, after the playback duration of the video CRBT reaches the preset configuration duration, the playback duration of the video CRBT is prolonged for a preset duration, and then the call request is sent to the called user. That is, if the calling user is willing to prolong the time of watching the video CRBT, the calling user may trigger the prolonging instruction of prolonging watching the video CRBT. After receiving the prolonging instruction, the platform prolongs the playback duration of the video CRBT for a certain period of time (i.e., the preset duration, which may be set according to the situation, for example, may be set to be 30 seconds. 40 seconds, etc.), and then sends the call request to the called user after a duration obtained by adding the certain period of time to the preset configuration duration, at this time, the called user can perceive the incoming call, and can answer the phone according to his/her own situation.

In an exemplary embodiment, the operation S206 may further include the following operations. Whether a prolonging instruction sent by the calling user for prolonging playback of the video CRBT is received within the preset configuration duration is determined; and when the prolonging instruction is received within the preset configuration duration, after the playback duration of the video CRBT reaches the preset configuration duration, the call request and the prolonging instruction are sent to the called user, wherein the prolonging instruction is used for prompting the called user to determine whether to postpone answering a call requested by the call request. That is, if the calling user is willing to prolong the time of watching the video CRBT, the calling user may trigger the prolonging instruction of prolonging watching the video CRBT. After receiving the prolonging instruction, the platform prolongs the play back duration of the video CRBT for a certain period of time (i.e., the preset duration, which may be set according to the situation, for example, may be set to be 30 seconds, 40 seconds, etc.), and then sends the call request and the prolonging instruction together to the called user, at this time, the called user can perceive the incoming call and know that the calling user is willing to prolong the playback duration of the video CRBT, and can determine whether to prolong the playback duration of the video CRBT according to his/her own condition. If the called user determines to prolong the playback duration of the video CRBT, the call is answered after a period of time, and if the called user determines not to prolong the play back duration of the video CRBT, the call may be answered immediately.

In an exemplary embodiment, whether a prolonging instruction sent by the calling user for prolonging playback of the video CRBT is received within the preset configuration duration is determined; and when the prolonging instruction is received within the preset configuration duration, a prompt message is sent to the called user while the call request is sent to the called user, wherein the prompt message is used for prompting that the calling user prolongs the play back of the video CRBT. If the prolonging instruction of the calling user indicating to prolong the play back duration of the video CRBT is received, the call request is transferred to the called user, and at the same time, the called user is notified that the calling user is interested in the video CRBT and wishes to prolong the playback duration. After acquiring the notification information, the called user may postpone answering the call requested by the call request, so that the playback duration in which the calling user watches the video CRBT is prolonged, and the calling user can watch the content of the video CRBT as completely as possible.

In an exemplary embodiment, the method may further include the following operations of: receiving an answering instruction indicating that the called user answers a call requested by the call request: stopping sending the video CRBT to the calling user according to the answering instruction; and when the playback duration of the video CRBT is greater than the preset configuration duration, storing a correlation between the video CRBT and the playback duration. After the call requested by the call request is answered, if the calling user has prolonged the playback duration of the video CRBT, the playback duration of the video CRBT is stored, so that the CRBT service can be optimized subsequently.

In an exemplary embodiment, an optimization solution for optimizing the video CRBT may be recommended to the called user according to the stored correlation between the video CRBT and the playback duration and taking a preset length of time as a period. After a period of time, the CRBT service may be optimized, so as to improve the delivery accuracy of the CRBT service.

The present embodiment provides a new CRBT service for a called user who needs to promote a CRBT. After a calling user initiates a call request towards the called user, the called user is not called immediately, instead, the calling is postponed for a certain period of time according to the configuration. In this way, when multiple calling parties call the called user, the multiple calling parties can watch the CRBT set by the called user at the same time, thereby greatly enlarging the play back range of the CRBT of the called user. On the other hand, the calling user may indicate, by means of instructions, to the platform whether the calling user is willing to prolong the listening and/or watching of the CRBT. After receiving the instruction, the platform may continue to postpone notifying the called user, and may alternatively directly notify and inform the called user that the calling user is interested in the CRBT, so that the called user can answer the CRBT later. At the same time, an extensible information processing module is provided for a user, which may allow the user to collect statistics on playback durations and the number of times of playback of the CRBT subscribed by the user, so as to facilitate data processing and calculation, and also facilitate subsequent expansion, for example, selecting a CRBT, which is played back for a longer time or for which interaction is performed more frequently, for playback, etc.

For example, if Zhang calls an account manager Wang working in China Merchants Bank, Zhang may immediately see a financial product video set by the China Merchants Bank, and if Li also calls Wang at the same time, Li can also see a corresponding advertisement video. Wang does not sense the calls when the video is played back, and therefore the promotion of the advertising video will not be affected by the answering of the phone, and Zhang and Li can see the set CRBT at the same time.

In addition, when the play back time reaches the set value, if Zhang wants to continue watching the financial product video. Zhang may press a key, and in response, the platform will continue to play back the CRBT till the end of the CRBT, and then answer Wang's call.

Figure 3:
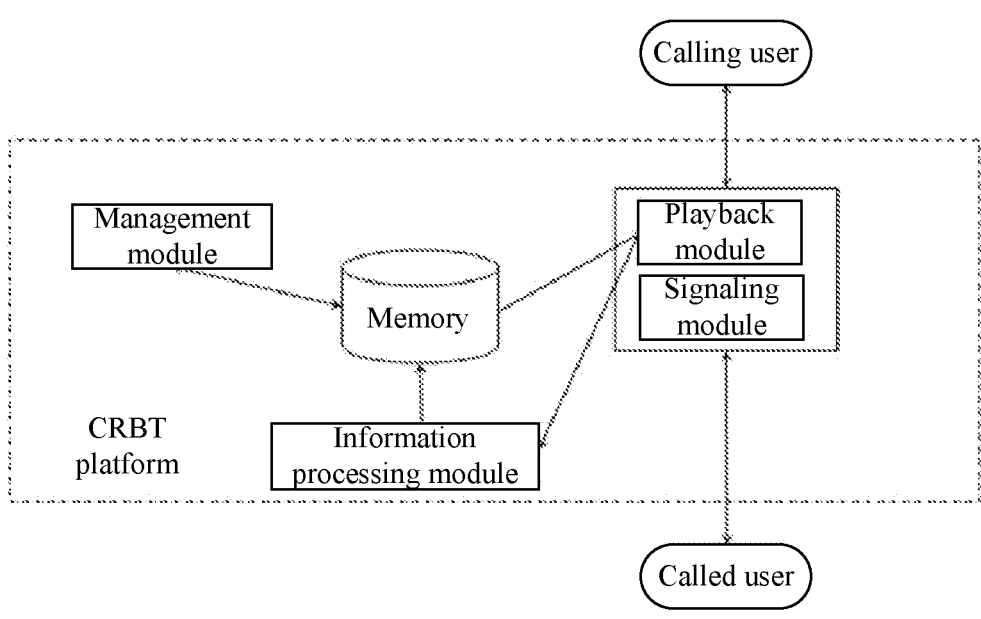
FIG. 3 is a block diagram of a CRBT system according to an embodiment of the present disclosure.

FIG. 3 is a block diagram of a CRBT system according to an embodiment of the present disclosure. As shown in FIG. 3, the system includes a management module, a playback processing module, a signaling processing module and an information processing module.

The management module is responsible for processing CRBT information and user information, and setting the prolonged playback duration and the instruction interaction information, etc.

The playback module is responsible for querying information of the CRBT of a called user, receiving an interaction instruction, processing prolonged playback of the CRBT, and sending information, such as a playback duration of the CRBT, to the information processing module for processing, playing back the CRBT for the calling user, and displaying the play back duration of the CRBT to the called user, etc.

The signaling processing module is responsible for notifying the playback processing module, performing signaling interaction, connecting to the called user, stopping playing back the CRBT, and transparently transmitting the backward signaling.

The information processing module is responsible for collecting the playback duration of the CRBT, etc., and may perform a customized service according to a service ordered by the called user, for example, collecting statistics on the playback duration of each CRBT and the number of times of interaction initiated by the calling user. The module allows system expansion, may collect statistics on popular CRBTs according to user requirements, and use an optimization algorithm to play back a specific CRBT, etc.

When the calling user A initiates a call towards the called user B, the call request is sent to the signaling processing module of the CRBT platform B via the core network.

The signaling processing module sends a signaling reply to the calling user A, sends the media information of the CRBT platform to the calling user, completes media negotiation with the calling user, and notifies the playback module for playback.

The playback module of the CRBT platform plays back the CRBT set for the calling user and receives interaction instruction from the calling user during a preset configuration duration.

If the playback module receives an interaction instruction of prolonging the playback from the calling user within the preset configuration duration, the CRBT platform continues playing back the CRBT for the calling user. For example, after receiving a request from the calling user of prolonging the playback of the CRBT, the CRBT platform directly calls the called user and continues playing back the CRBT for the calling user.

If the playback module of the CRBT platform does not receive the interaction instruction within the preset configuration duration, the playback module notifies the signaling processing module to call the called user. For example, after receiving a response message from the called user, the signaling processing module of the CRBT platform completes media negotiation between the CRBT platform and the called user, and at the same time, a color alerting is played back for the called user, and the request from the calling user of wishing to prolong the playback of the CRBT is sent to the called user by means of a media stream or other means.

The signaling processing module of the CRBT platform connects the called user, and completes media negotiation between the CRBT platform and the called user. The playback module continues playing back the CRBT to the calling user, and at the same time, the playback module plays back the color alerting to the called user, so that the called user knows that the calling user has prolonged the playback of the CRBT. After receiving the request from the calling user of prolonging the CRBT, the called user selects the answering time according to the situation.

When receiving an answering message of the called user, the signaling processing module of the CRBT platform stops the play back, and notifies the playback module to store information about CRBT playback. At the same time, the signaling processing module of the CRBT platform performs renegotiation to complete media negotiation between the calling user and the called user so as to enable the calling user and the called user to start having the call, and transparently transmits the subsequent signaling.

By means of the present embodiment, the restriction of playing back a CRBT can be broadened, and the CRBT can still be played back in a non-idle state of the called user, so that the audience group watching the CRBT is expanded, and the popularization of the CRBT of the called user can be effectively promoted. By configuring the time delay, the playback duration of the CRBT can be prolonged effectively, intuitively enhancing the perceptual experience of the play back. Furthermore, the calling user can request, through the platform, to postpone the answering of the called user, which also improves the promotion to a certain extent. The technical solution also facilitates the extension of the preferred CRBT and helps the user to find the popular CRBT to enhance the promotion.

Figure 4:
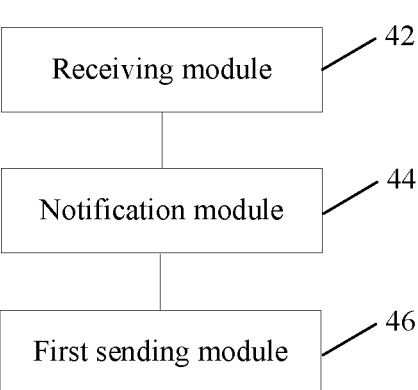
FIG. 4 is a block diagram of an apparatus for processing a CRBT according to an embodiment of the present disclosure.

According to another embodiment of the present disclosure, further provided is an apparatus for processing a coloring ring back tone. FIG. 4 is a block diagram of an apparatus for processing a CRBT according to an embodiment of the present disclosure. As shown in FIG. 4, the apparatus is applied to the CRBT platform, and includes:

a receiving module 42, configured to receive, via a core network, a call request initiated by a calling user towards a called user;

a notification module 44, configured to send, according to the call request, to the calling user a video CRBT preset by the called user, and notify the calling user to play back the video CRBT; and a first sending module 46, configured to send the call request to the called user after a playback duration of the video CRBT reaches a preset configuration duration.

In an exemplary embodiment, the apparatus further includes:

a determination module, configured to determine whether a prolonging instruction sent by the calling user for prolonging playback of the video CRBT is received within the preset configuration duration; and a prompt module, configured to send, when the prolonging instruction is received within the preset configuration duration, a prompt message to the called user while sending the call request to the called user, wherein the prompt message is used for prompting that the calling user prolongs the play back of the video CRBT.

In an exemplary embodiment, the first sending module 46 is further configured to:

determine whether a prolonging instruction sent by the calling user for prolonging play back of the video CRBT is received within the preset configuration duration; and when the prolonging instruction is received within the preset configuration duration, after the playback duration of the video CRBT reaches the preset configuration duration, prolong the playback duration of the video CRBT for a preset duration, and then sending the call request to the called user.

In an exemplary embodiment, the first sending module 46 is further configured to:

determine whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, send the call request and the prolonging instruction to the called user, wherein the prolonging instruction is used for prompting the called user to determine whether to postpone answering a call requested by the call request.

In an exemplary embodiment, the apparatus further includes:

a receiving module, configured to receive an answering instruction indicating that the called user answers a call requested by the call request;

a second sending module, configured to stop sending the video CRBT to the calling user according to the answering instruction; and a storage module, configured to store, when the playback duration of the video CRBT is greater than the preset configuration duration, a correlation between the video CRBT and the playback duration.

In an exemplary embodiment, the apparatus further includes:

an optimization module, configured to recommend, according to the stored correlation between the video CRBT and the playback duration and taking a preset length of time as a period, to the called user an optimization solution for optimizing the video CRBT.

The embodiments of the present disclosure further provide a computer-readable storage medium storing a computer program, wherein the computer program, when running on a processor, causes the processor to execute the operations in any one of the described method embodiments.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure further provide an electronic apparatus, including a memory and a processor: the memory stores a computer program, and the processor is configured to run the computer program, so as to execute the operations in any one of the method embodiments.

In an exemplary embodiment, the electronic apparatus may further include a transmission device and an input/output device, wherein the transmission device is connected to the processor, and the input/output device is connected to the processor.

For specific examples in the present embodiment, reference can be made to the examples described in the described embodiments and exemplary embodiments, and thus they will not be repeated again in the present embodiment.

It is apparent that a person having ordinary in the art shall understand that all of the above-mentioned modules or operations in the present disclosure may be implemented by using a general computation apparatus, may be centralized on a single computation apparatus or may be distributed on a network composed of multiple computation apparatuses. They may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the present disclosure is not limited to any specific hardware and software combinations.

The content above only relates to exemplary embodiments of the present disclosure, and is not intended to limit the present disclosure. For a person having ordinary skill in the art, the present disclosure may have various modifications and changes. Any modifications, equivalent replacements, improvements, etc. made within the principle of the present disclosure shall all fall within the scope of protection of the present disclosure.

What is claimed is:

1. A method for processing a Caller Ring Back Tone (CRBT), comprising:

receiving, via a core network, a call request initiated by a calling user towards a called user;

sending, according to the call request, to the calling user a video CRBT preset by the called user, and notifying the calling user to play back the video CRBT; and sending the call request to the called user after a playback duration of the video CRBT reaches a preset configuration duration, wherein the method further comprises: determining whether a prolonging instruction sent by the calling user for prolonging playback of the video CRBT is received within the preset configuration duration; and sending, when the prolonging instruction is received within the preset configuration duration, a prompt message to the called user while sending the call request to the called user, wherein the prompt message is used for prompting that the calling user prolongs the playback of the video CRBT;

or, sending the call request to the called user after the playback duration of the video CRBT reaches the preset configuration duration comprises: determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, prolonging the playback duration of the video CRBT for a preset duration, and then sending the call request to the called user;

or, sending the call request to the called user after the playback duration of the video CRBT reaches the preset configuration duration comprises: determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, sending the call request and the prolonging instruction to the called user, wherein the prolonging instruction is used for prompting the called user to determine whether to postpone answering a call requested by the call request.

2. The method according to claim 1, wherein the method further comprises:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the playback duration.

3. The method according to claim 2, wherein the method further comprises:

recommending, according to the stored correlation between the video CRBT and the playback duration and taking a preset length of time as a period, to the called user an optimization solution for optimizing the video CRBT.

4. The method according to claim 1, wherein the method further comprises:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the playback duration.

5. The method according to claim 4, wherein the method further comprises:

recommending, according to the stored correlation between the video CRBT and the playback duration and taking a preset length of time as a period, to the called user an optimization solution for optimizing the video CRBT.

6. The method according to claim 1, wherein the method further comprises:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the playback duration.

7. The method according to claim 6, wherein the method further comprises:

recommending, according to the stored correlation between the video CRBT and the playback duration and taking a preset length of time as a period, to the called user an optimization solution for optimizing the video CRBT.

8. A non-transitory computer-readable storage medium storing a computer program, wherein the computer program, when running on a processor, causes the processor to execute following operations:

receiving, via a core network, a call request initiated by a calling user towards a called user;

sending, according to the call request, to the calling user a video Caller Ring Back Tone (CRBT) preset by the called user, and notifying the calling user to play back the video CRBT; and sending the call request to the called user after a playback duration of the video CRBT reaches a preset configuration duration, wherein the computer program, when running on the processor, causes the processor to further execute following operations: determining whether a prolonging instruction sent by the calling user for prolonging playback of the video CRBT is received within the preset configuration duration; and sending, when the prolonging instruction is received within the preset configuration duration, a prompt message to the called user while sending the call request to the called user, wherein the prompt message is used for prompting that the calling user prolongs the playback of the video CRBT;

or, sending the call request to the called user after the playback duration of the video CRBT reaches the preset configuration duration comprises: determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, prolonging the playback duration of the video CRBT for a preset duration, and then sending the call request to the called user;

or, sending the call request to the called user after the playback duration of the video CRBT reaches the preset configuration duration comprises: determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, sending the call request and the prolonging instruction to the called user, wherein the prolonging instruction is used for prompting the called user to determine whether to postpone answering a call requested by the call request.

9. An electronic device, comprising a memory and a processor, wherein the memory stores a computer program, and the processor is configured to run the computer program so as to execute following operations:

receiving, via a core network, a call request initiated by a calling user towards a called user;

sending, according to the call request, to the calling user a video Caller Ring Back Tone (CRBT) preset by the called user, and notifying the calling user to play back the video CRBT; and sending the call request to the called user after a playback duration of the video CRBT reaches a preset configuration duration, wherein the processor is configured to run the computer program so as to further execute following operations: determining whether a prolonging instruction sent by the calling user for prolonging playback of the video CRBT is received within the preset configuration duration; and sending, when the prolonging instruction is received within the preset configuration duration, a prompt message to the called user while sending the call request to the called user, wherein the prompt message is used for prompting that the calling user prolongs the playback of the video CRBT;

or, sending the call request to the called user after the playback duration of the video CRBT reaches the preset configuration duration comprises: determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, prolonging the playback duration of the video CRBT for a preset duration, and then sending the call request to the called user;

or, sending the call request to the called user after the playback duration of the video CRBT reaches the preset configuration duration comprises: determining whether a prolonging instruction sent by the calling user for prolonging playback of the video CRBT is received within the preset configuration duration; and when the prolonging instruction is received within the preset configuration duration, after the playback duration of the video CRBT reaches the preset configuration duration, sending the call request and the prolonging instruction to the called user, wherein the prolonging instruction is used for prompting the called user to determine whether to postpone answering a call requested by the call request.

10. The electronic device according to claim 9, wherein the processor is configured to run the computer program so as to further execute following operations:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the playback duration.

11. The electronic device according to claim 10, wherein the processor is configured to run the computer program so as to further execute following operations:

recommending, according to the stored correlation between the video CRBT and the playback duration and taking a preset length of time as a period, to the called user an optimization solution for optimizing the video CRBT.

12. The electronic device according to claim 9, wherein the processor is configured to run the computer program so as to further execute following operations:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the playback duration.

13. The electronic device according to claim 12, wherein the processor is configured to run the computer program so as to further execute following operations:

recommending, according to the stored correlation between the video CRBT and the playback duration and taking a preset length of time as a period, to the called user an optimization solution for optimizing the video CRBT.

14. The electronic device according to claim 9, wherein the processor is configured to run the computer program so as to further execute following operations:

receiving an answering instruction indicating that the called user answers a call requested by the call request;

stopping sending the video CRBT to the calling user according to the answering instruction; and when the playback duration of the video CRBT is greater than the preset configuration duration, storing a correlation between the video CRBT and the playback duration.

* * * * *